US010523594B2

(12) United States Patent
Okamoto et al.

(10) Patent No.: US 10,523,594 B2
(45) Date of Patent: Dec. 31, 2019

(54) INFORMATION PROCESSING APPARATUS AND NETWORK SWITCHING METHOD (71) Applicant: Panasonic Intellectual Property Management Co., Ltd., Osaka (JP)

(72) Inventors: Ryuichi Okamoto, Osaka (JP); Masaki Mukai, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 84 days.

(21) Appl. No.: 15/982,066

(22) Filed: May 17, 2018

(65) Prior Publication Data

US 2018/0270167 A1 Sep. 20, 2018

Related U.S. Application Data (63) Continuation of application No. PCT/JP2016/005093, filed on Dec. 9, 2016.

(30) Foreign Application Priority Data

Dec. 17, 2015 (JP) ................................ 2015-245844

(51) Int. Cl.
*H04L 12/28* (2006.01)
*H04L 12/931* (2013.01)
(Continued)

(52) U.S. Cl.
CPC ........ *H04L 49/205* (2013.01); *H04L 12/4641* (2013.01); *H04L 45/302* (2013.01); *H04L 65/80* (2013.01)

(58) Field of Classification Search
None
See application file for complete search history.

(56) References Cited

U.S. PATENT DOCUMENTS 6,856,591 B1 * 2/2005 Ma ...................... H04L 41/0631
370/216
7,433,317 B2 * 10/2008 Kobayashi .......... H04L 12/4641
370/241
(Continued)

FOREIGN PATENT DOCUMENTS

JP 2008-520164 6/2006
JP 2014-49783 3/2014
(Continued)

OTHER PUBLICATIONS

International Search Report dated Feb. 21, 2017 in International (PCT) Application No. PCT/JP2016/005093.

*Primary Examiner* — Elisabeth Benoit Magloire
(74) *Attorney, Agent, or Firm* — Wenderoth, Lind & Ponack, L.L.P.

(57) ABSTRACT

An information processing apparatus according to the present disclosure includes a communication unit that can connect to a plurality of networks including a first network, a storage unit that stores priority level information indicating priority levels of the plurality of networks, and a processor. When the communication unit is connected to the first network, the processor decides a next connection destination candidate on the basis of the priority level information, checks whether an operation requiring continuous connection between the communication unit and any one of the plurality of networks is being executed, and checks whether a virtual network has been established. If the operation is being executed and a virtual network has been established, the processor switches the connection destination of the communication unit from the first network to the next connection destination candidate.

3 Claims, 5 Drawing Sheets

(51) Int. Cl.
  *H04L 12/725*    (2013.01)
  *H04L 12/46*     (2006.01)
  *H04L 29/06*     (2006.01)

(56) References Cited

U.S. PATENT DOCUMENTS

| | | | |
|---|---|---|---|
| 2004/0077341 A1* | 4/2004 | Chandranmenon ... | H04W 36/14 455/418 |
| 2007/0297378 A1* | 12/2007 | Poyhonen ............. | H04W 48/18 370/338 |
| 2008/0200168 A1* | 8/2008 | Jiang ..................... | H04W 48/18 455/432.1 |
| 2015/0188780 A1* | 7/2015 | Spieser ............... | H04L 41/5009 370/252 |
| 2016/0301579 A1* | 10/2016 | Djukic ................ | H04L 41/5009 |

FOREIGN PATENT DOCUMENTS

| | | |
|---|---|---|
| WO | 2006/055127 A2 | 5/2006 |
| WO | 2006/055127 A3 | 5/2006 |

\* cited by examiner

| Identification information | Priority level information |
|---|---|
| Network A | 1 |
| Network B | 2 |
| Network C | 3 |
| ... | ... |
| Network ... | N |

INFORMATION PROCESSING APPARATUS AND NETWORK SWITCHING METHOD

BACKGROUND

1. Technical Field

The present disclosure relates to an information processing apparatus having a network connection function and a network switching method.

2. Description of the Related Art

Jpn. PCT National Publication No. 2008-520164 discloses an information processing apparatus that makes attempts to connect to a plurality of networks in order of priority.

SUMMARY

An information processing apparatus according to the present disclosure includes a communication unit, a memory, and a processor. The communication unit can connect to a plurality of networks including a first network. The memory stores priority level information indicating priority levels of a plurality of networks. When the communication unit is connected to the first network, the processor decides, on the basis of the priority level information, a next connection destination candidate to be connected next to the communication unit among the plurality of networks. In addition, the processor checks whether an operation requiring continuous connection between the communication unit and any one of the plurality of networks is being executed. The processor also checks whether a virtual network has been established. Furthermore, when such an operation is being executed and a virtual network has been established, the processor switches a connection destination of the communication unit from the first network to the next connection destination candidate.

A network switching method according to the present disclosure includes a decision step, a first checking step, a second checking step, and a switching step. In the decision step, when the first network of the plurality of networks is a connection destination, a next connection destination candidate to be connected after the first network is decided among the plurality of networks on the basis of the priority levels of the plurality of networks. In the first checking step, it is checked whether an operation requiring continuous connection to any one of the plurality of networks is being executed. In the second checking step, it is checked whether a virtual network has been established. In the switching step, the connection destination is switched from the first network to the next connection destination candidate on the basis of results obtained in the first checking step and the second checking step.

The information processing apparatus according to the present disclosure can properly manage connection to networks.

DETAILED DESCRIPTION

An exemplary embodiment will be described in detail below with reference to the accompanying drawings, as needed. Note, however, that unnecessarily detailed descriptions will sometimes be omitted. For example, detailed descriptions of well-known particulars and redundant descriptions of substantially identical arrangements will sometimes be omitted. This is to avoid the following description from becoming unnecessarily redundant, and to facilitate understanding of a person skilled in the art.

Note that the accompanying drawings and the following description are provided to allow a person skilled in the art to sufficiently understand the present disclosure and are not intended to limit subject matters described in the claims.

Exemplary Embodiment

An exemplary embodiment will be described with reference to FIGS. 1 to 5.

[1-1-1. Arrangement of System]

Figure 1:
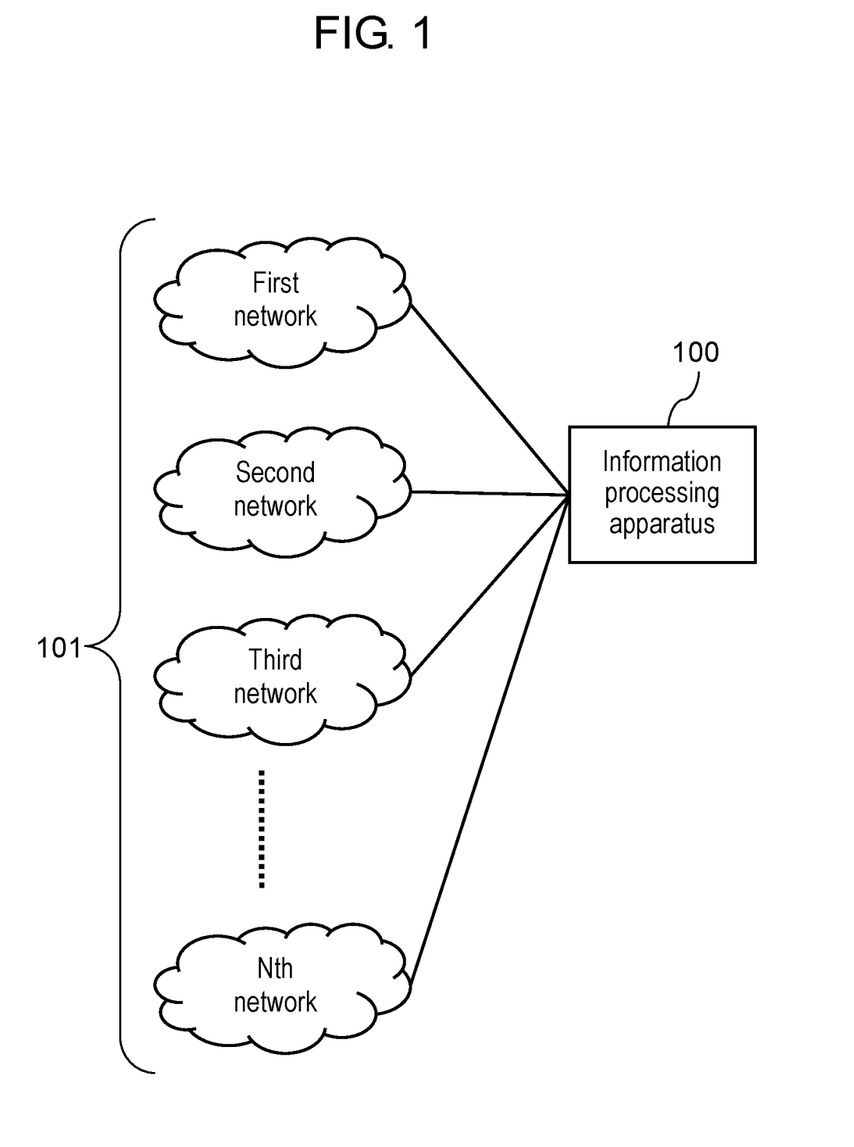
FIG. 1 is a diagram for explaining an environment in which an information processing apparatus according to an exemplary embodiment operates.

FIG. 1 is a diagram for explaining an environment in which information processing apparatus 100 according to an exemplary embodiment operates. Referring to FIG. 1, information processing apparatus 100 operates in an environment including one or more networks 101.

Networks 101 are those to which information processing apparatus 100 can connect. Networks 101 include various types of known networks. For example, networks 101 include a wireless wide area network (WWAN) that is a communication service for connection to a wide area data communication network by wireless communication, a wireless local area network/wireless LAN (WLAN) that is a local area communication network for performing wireless transmission and reception of data, a worldwide interoperability for microwave access (WiMAX (registered trademark)) network that is one of standards of wireless communication technology, and a wired local area network (LAN) that is a local area communication network in which devices are connected via communication cables such as copper wires or optical fibers for performing communication by transmission and reception of electricity or light.

According to the present disclosure, when information processing apparatus 100 is connected to one of these physical networks 101, a virtual network can be established on network 101. A virtual network is, for example, a virtual private network (VPN) or a virtual local area network (VLAN). An example of a VPN includes an Internet VPN such as an SSL-VPN. A VPN is used as, for example, a corporate network in which business sites dispersed across the country are connected to each other in a state closed from the outside.

[1-1-2. Arrangement of Information Processing Apparatus]

Figure 2:
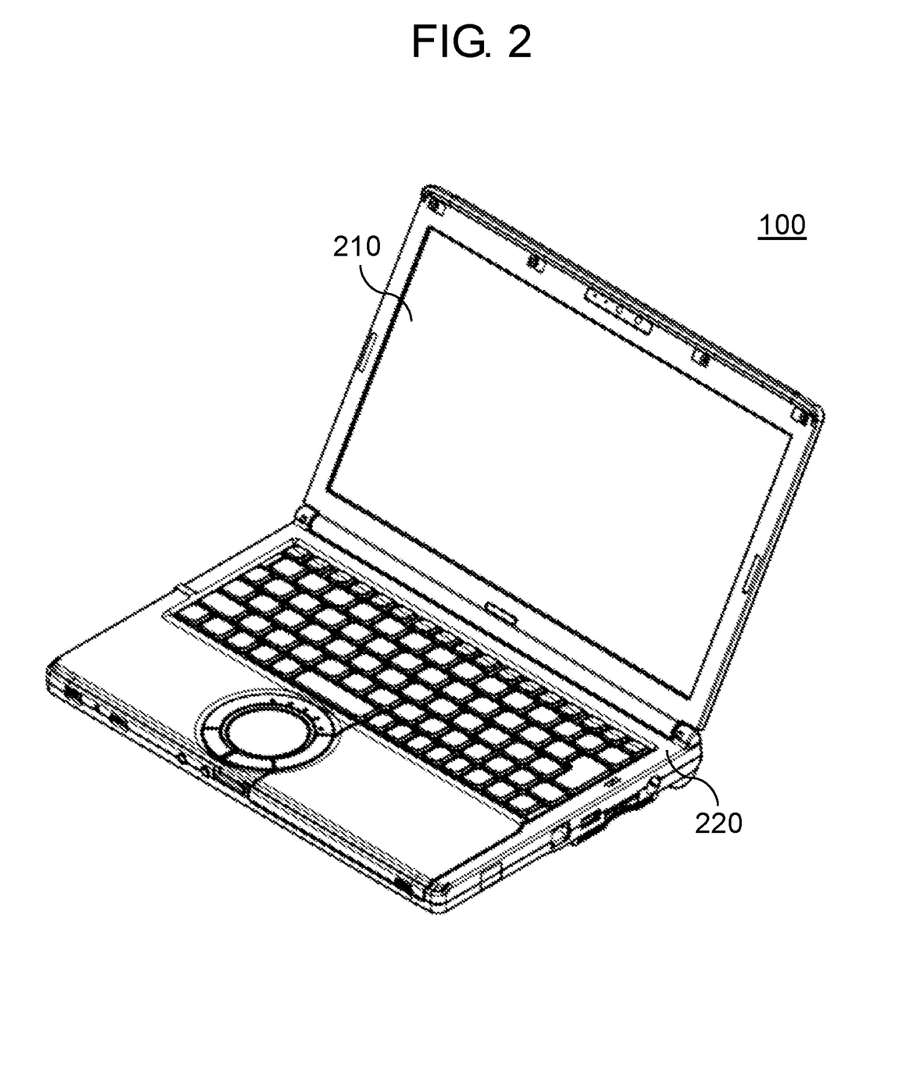
FIG. 2 is an external view of the information processing apparatus according to the exemplary embodiment.

FIG. 2 is an external view of information processing apparatus 100 according to the exemplary embodiment.

Information processing apparatus 100 performs predetermined information processing on the basis of an operating system (OS). This exemplary embodiment will be described by using information processing apparatus 100 as, for example, a notebook personal computer.

Note that information processing apparatus 100 according to the present disclosure is not limited to a notebook personal computer. It is possible to use a laptop personal computer (PC), tablet PC, smartphone, wearable computer, or the like as processing apparatus 100.

Information processing apparatus 100 includes output unit 210 and input unit 220.

Output unit 210 displays images and videos. A liquid crystal display is typically used as output unit 210.

Input unit 220 accepts inputs. Typically, as input unit 220, a touch panel, a keyboard, a touch pad, buttons, and the like are used.

Figure 3:
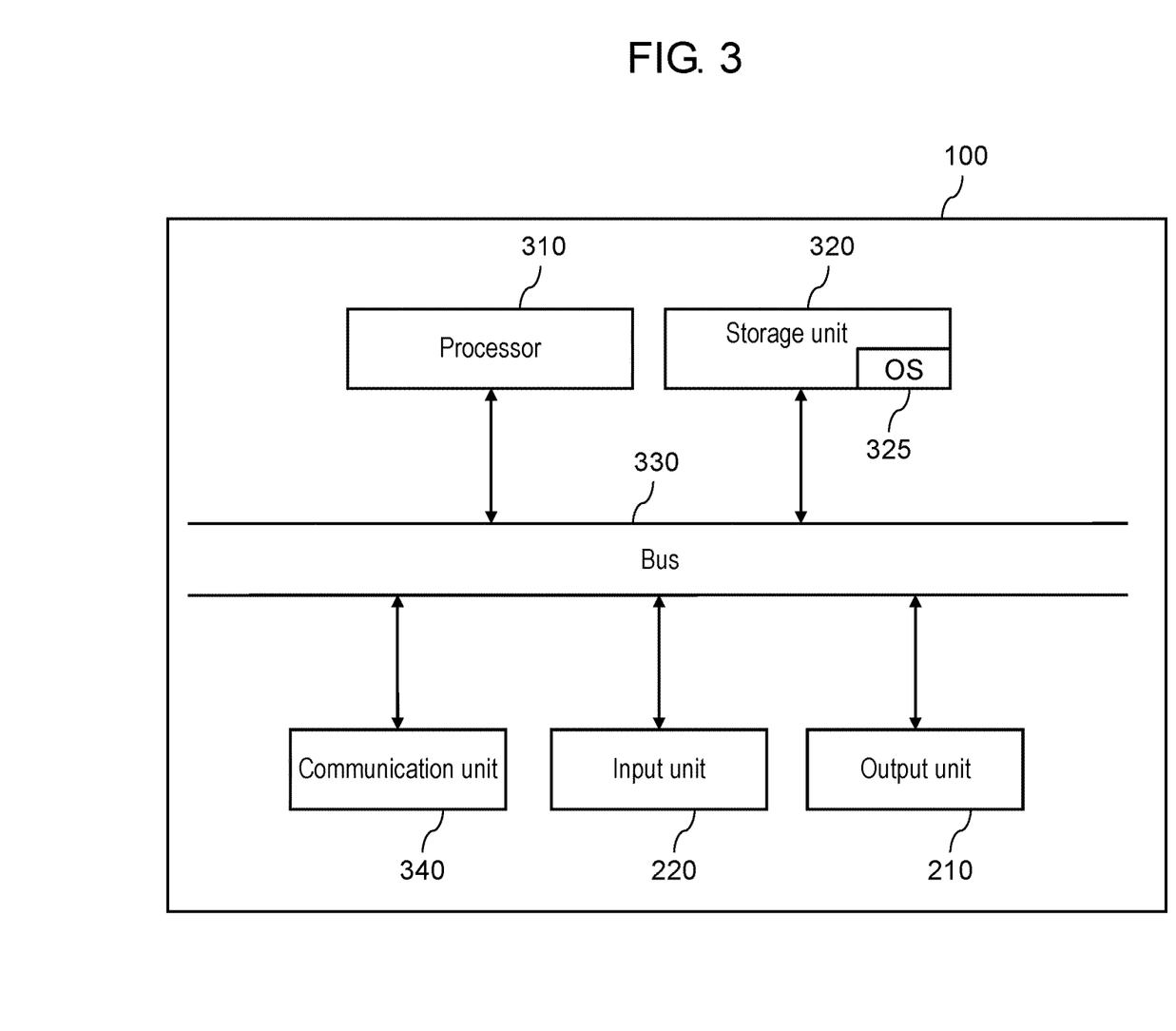
FIG. 3 is a block diagram of the information processing apparatus according to the exemplary embodiment.

FIG. 3 is a block diagram of information processing apparatus 100 according to the exemplary embodiment. As shown in FIG. 3, information processing apparatus 100 includes processor 310, memory 320, bus 330, and communication unit 340 in addition to output unit 210 and input unit 220.

Processor 310 controls other constituent elements of information processing apparatus 100 by executing programs. For example, processor 310 executes connection to network 101 by controlling communication unit 340.

Memory 320 temporarily or permanently saves data necessary for processing in information processing apparatus 100. For example, memory 320 saves OS 325, programs, and profiles to be described later. As memory 320, a volatile memory, a nonvolatile memory, a hard disk drive (HDD), or the like is used.

OS 325 is software for managing an operation of information processing apparatus 100.

Bus 330 is a component through which electrical signals transmitted and received by other constituent elements of information processing apparatus 100 pass. Control signals and data are transmitted and received among the respective constituent elements of information processing apparatus 100 via bus 330.

Communication unit 340 makes attempts to connect to networks 101, establishes connection, and performs disconnection from networks 101 under the control of processor 310. In this case, to make an attempt to connect to network 101 is to cause processor 310 to communicate with a gateway defined for network 101 via communication unit 340 to establish connection to network 101. When connection is established, a terminal existing in network 101 can communicate with information processing apparatus 100 after the above attempt to connect. In addition, communication unit 340 detects a communication card or network cable connected to information processing apparatus 100 or detects electric waves in a WWAN or WLAN existing in a space to specify a network to which information processing apparatus 100 can connect. Communication unit 340 notifies processor 310 of a network specified as a network to which information processing apparatus 100 can connect.

Note that a number of communication units 340 may be one or more. For example, a plurality of communication units 340 may be WWAN, WLAN, WiMAX, and wired LAN communication units, respectively and one-to-one correspond to the respective networks.

Note that the above constituent elements may constitute information processing apparatus 100 while being physically independent of each other or constitute information processing apparatus 100 while partly being integrated. For example, some or all of functions of processor 310, memory 320, and communication unit 340 are integrated and implemented into one large scale integration (LSI).

In addition, to form each of the above constituent elements, physically independent other constituent elements are sometimes combined. For example, to form logically single memory 320, a plurality of physically different memorys are sometimes used.

In addition, in order to disperse a load on processor 310, a plurality of processors or a microcontroller incorporated in communication unit 340 or memory 320 sometimes performs actual processing. In this exemplary embodiment, elements for performing these processes are generically defined as processor 310.

[1-1-3. Arrangement of Profile]

Figure 4:
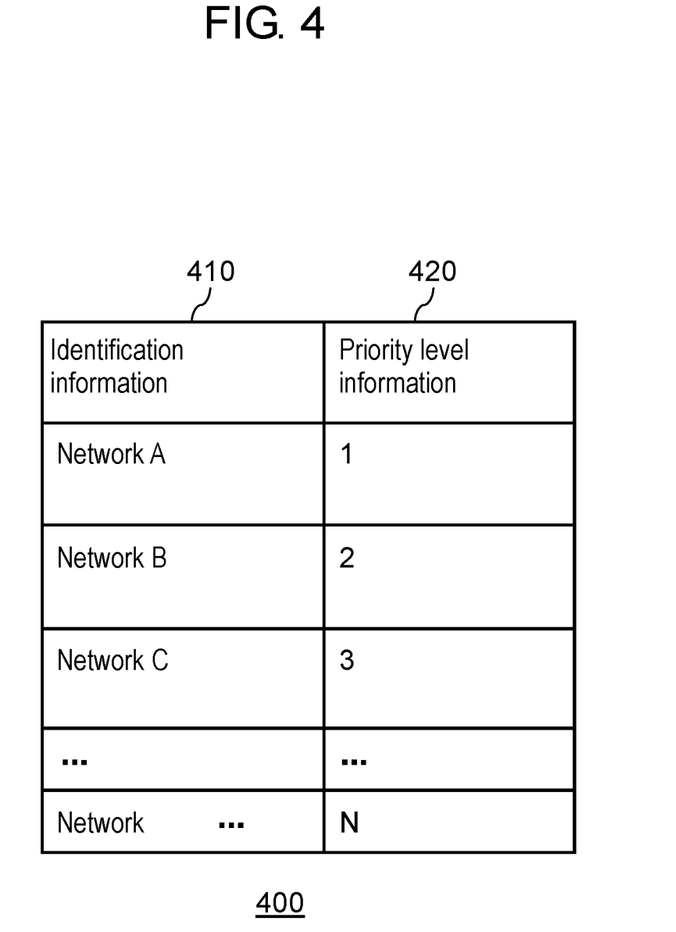
FIG. 4 is a diagram showing an example of a profile saved in a memory in the information processing apparatus according to the exemplary embodiment.

FIG. 4 is a diagram showing an example of a profile saved in memory 320 of information processing apparatus 100 according to the exemplary embodiment. Profile 400 is information in a database form. Profile 400 stores one or more combinations of identification information 410 and corresponding priority level information 420.

Identification information 410 is information identifying network 101 to which information processing apparatus 100 connects. Identification information 410 is information specifying a network type such as "WLAN", "WiMAX", "WWAN", or "wired LAN". Identification information 410 is not limited to the above information specifying a network type. Identification information 410 may include a service set identifier (SSID) as an identifier of an access point in a wireless LAN or information identifying a WiMAX or WWAN provider. Alternatively, identification information 410 may be a name arbitrarily given by a user to a specific network. That is, identification information 410 may be provided to at least specify each of the plurality of networks 101 as a connection destination.

Priority level information 420 is information indicating a rank in a priority order of connection to networks 101. Note that a rank in the priority order of connection to networks 101 will be referred to as a priority level hereinafter. In this case, for example, when information processing apparatus 100 can connect to both network A and network B, processor 310 refers to priority level information 420 to cause communication unit 340 to make an attempt to connect to a network with a high priority level. In this exemplary embodiment, a priority level with a smaller value, that is, priority level information 420 with a smaller numerical value, indicates a higher priority level. Accordingly, when information processing apparatus 100 can connect to both network A and network B, processor 310 causes communication unit 340 to make an attempt to connect to network A. In the exemplary embodiment, processor 310 specifies, at predetermined intervals, for example, at intervals of several seconds to several milliseconds, whether there is any connectable network among networks 101. When there are a plurality of connectable networks, communication unit 340 makes attempts to connect to the networks in ascending order of the values of the priority levels in accordance with priority level information 420.

[1-2. Operation]

An operation of information processing apparatus 100 having the above arrangement will be described.

Figure 5:
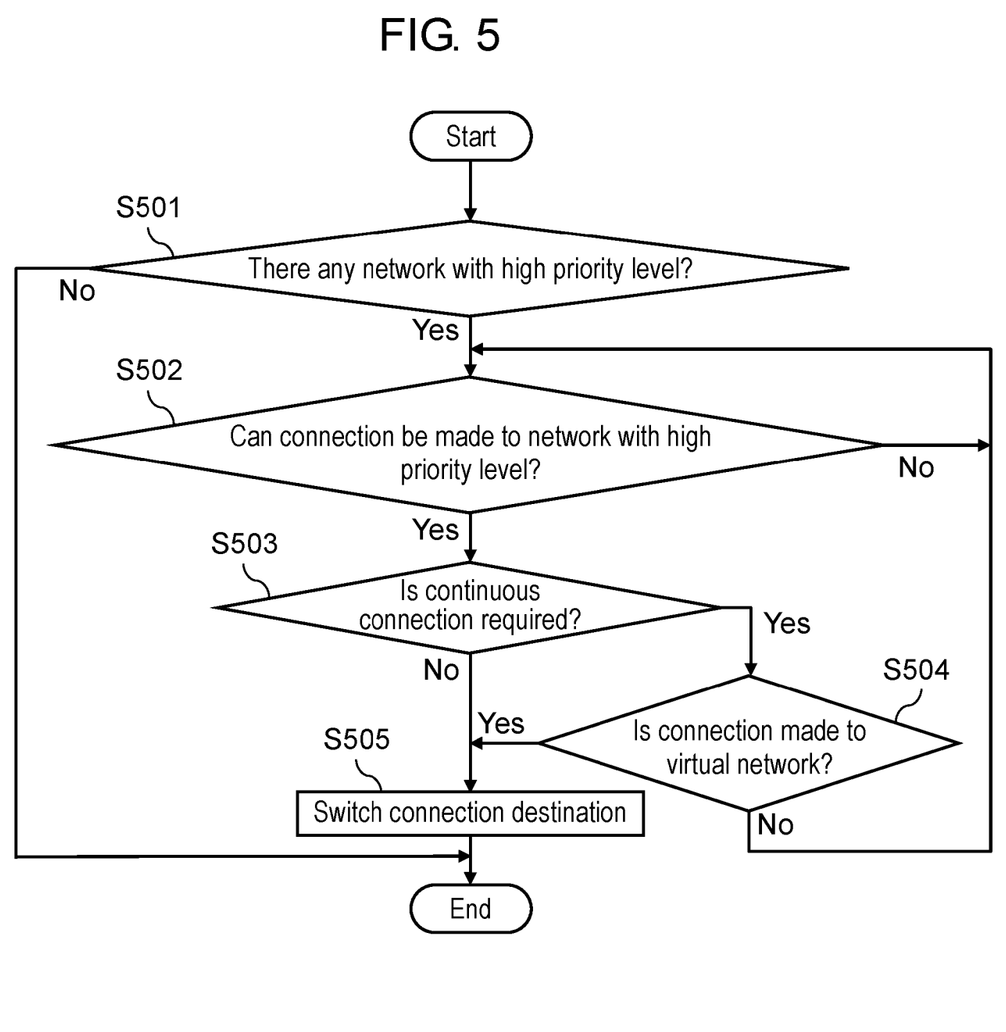
FIG. 5 is a flowchart showing an operation to be performed when the information processing apparatus according to the exemplary embodiment is connected to a network.

FIG. 5 is a flowchart showing an operation to be performed in a case in which information processing apparatus 100 according to the exemplary embodiment is connected to any one of the plurality of networks 101.

Assume that information processing apparatus 100 is connected to, for example, network C (first network) in FIG. 4 of the plurality of networks 101 at the start of the flowchart of FIG. 5. When information processing apparatus 100 is connected to network C, processing is started according to the flowchart shown in FIG. 5.

Processor 310 refers to profile 400 saved in memory 320 to check whether profile 400 includes network 101 with a priority level higher than that of currently connected network C (step S501). If profile 400 includes network 101 with a high priority level (YES), the process advances to step S502. If profile 400 does not include network 101 with a high priority level (NO), the processing in the flowchart of FIG. 5 is terminated. When, for example, information processing apparatus 100 is connected to network 101 with identification information 410 indicating "network C", because priority level information 420 of the network is "3", processor 310 determines that profile 400 includes network 101 with priority level "1" or "2" higher than priority level "3". The process then advances to step S502. In contrast, when, for example, information processing apparatus 100 is connected to network 101 with identification information 410 indicating "network A", because the priority level of the network is "1", processor 310 determines that profile 400 does not include network 101 with a higher priority level. The processing in the flowchart of FIG. 5 is then terminated. Processor 310 checks whether information processing apparatus 100 can be connected to network 101 with a priority level higher than that of currently connected network C (step S502). More specifically, processor 310 controls communication unit 340 to make this check by searching for network 101 with a priority level higher than that of network C. If information processing apparatus 100 can be connected to network 101 with a priority level higher than that of currently connected network C (YES), processor 310 decides connectable network 101 as a next connection destination candidate to be connected after network C, and the process advances to step S503. In this case, if there are a plurality of connectable networks 101, processor 310 decides network 101 with the highest priority level as a next connection destination candidate on the basis of priority level information 420. If information processing apparatus 100 cannot be connected to network 101 with a priority level higher than that of currently connected network C (NO), the process advances again to step S502 after the lapse of a predetermined time.

Processor 310 then determines whether information processing apparatus 100 is performing an operation requiring continuous connection to network 101 (step S503). More specifically, processor 310 checks a communication situation of communication unit 340, and determines whether information processing apparatus 100 is continuously communicating via currently connected network C. If communication unit 340 is continuously communicating (YES), the process advances to step S504. If communication unit 340 is not continuously communicating (NO), the process advances to step S505. An operation requiring continuous connection to network 101 includes, for example, a file download operation and a file upload operation.

Processor 310 then checks whether a virtual network has been established by information processing apparatus 100 (step S504). If a virtual network has been established (YES), the process advances to step S505. If no virtual network has not been established (NO), connection to currently connected network C is maintained, and the process advances again to step S502 after the lapse of a predetermined time. Concrete methods of causing processor 310 to check whether a virtual network has been established include a method of checking whether there is a virtual adapter in communication unit 340 and checking, if any, whether the virtual adapter has been connected to a network. If the virtual adapter is connected to the network, processor 310 determines that the virtual network has been established. In addition, another method is to check whether there is a virtual network in a network determined by OS 325 to be set in a connected state. If there is a virtual network in a network determined by OS 325 to be set in a connected state, processor 310 determines that a virtual network has been established. The methods of determining whether a virtual network has been established are not limited to the above methods. For example, it is possible to use other methods, such as checking whether there is dedicated software which establishes a virtual network and operates on OS 325 and notifying, if any, processor 310 whether the dedicated software has established a virtual network.

Processor 310 controls communication unit 340 to switch a connection destination of communication unit 340 from network C to a network decided as a next connection destination candidate in step S502 (step S505).

[1-3. Effects and the Like]

As described above, information processing apparatus 100 according to the present disclosure includes communication unit 340, memory 320, and processor 310. Communication unit 340 is connected to the plurality of networks 101. Memory 320 stores priority level information 420 of the plurality of networks 101. When communication unit 340 is connected to an arbitrary network (first network), processor 310 decides, on the basis of priority level information 420, a next connection destination candidate to be connected next to communication unit 340, among the plurality of networks 101. Processor 310 checks whether an operation requiring continuous connection between communication unit 340 and any one of the plurality of networks 101 is being executed. Processor 310 checks whether a virtual network has been established. If the above operation is being executed and a virtual network has been established, the connection destination of communication unit 340 is switched from the first network to the next connection destination candidate.

A network switching method according to the present disclosure includes a decision step, a first checking step, a second checking step, and a switching step. In the decision step, if the first network of the plurality of networks 101 is set as a connection destination, a next connection destination candidate to be connected after the first network is decided among the plurality of networks 101 on the basis of the priority levels of the plurality of networks 101. In the first checking step, it is checked whether an operation requiring continuous connection to any one of the plurality of networks 101 is being executed. In the second checking step, it is checked whether a virtual network has been established. In the switching step, a destination is switched from the first network to the next connection destination candidate on the basis of results obtained in the first checking step and the second checking step.

In the present disclosure, assume that a connection can be made to a network with a higher priority level, an operation requiring continuous connection to a network is being operated, and a virtual network has been established. In this case, it is possible to switch the connection to a network with a higher priority level. This makes it possible for the information processing apparatus according to the present disclosure to properly manage network connection.

A specific use application will be exemplarily described. According to the present disclosure, when a virtual network has been established and information processing apparatus 100 is in the process of downloading a given file, the connection is switched to a network with a higher priority level. In this case, even if the connection is switched to a network, because the virtual network has been established, downloading can be continued. This makes it possible to shorten the time taken for downloading by switching the connection to a network with a higher communication rate and continuing the downloading.

Note that in the exemplary embodiment, in the step of deciding a next connection destination candidate, networks with priority levels higher than that of a connected network are extracted first (step S501). Connectable networks are extracted from the extracted networks (step S502). A next connection destination candidate is then decided among the extracted networks. However, the decision step to be executed is not limited to this. For example, first of all, among all networks 101 that can be connected to communication unit 340, networks that are connectable at this moment are extracted. It is possible to decide a next connection destination candidate among the searched and extracted networks on the basis of priority level information 420.

The present disclosure can be applied to an information processing apparatus having a network connection function. More specifically, the present disclosure can be applied to a personal computer, smartphone, wearable computer, and the like.

What is claimed is:

1. An information processing apparatus comprising:
a communication unit configured to be connected to a plurality of networks including a first network;
a memory configured to store priority level information indicating priority levels of the plurality of networks; and
a processor configured to switch a connection destination of the communication unit,
when the communication unit is connected to the first network, the processor
decides, based on the priority level information, a next connection destination candidate to be connected next to the communication unit, among the plurality of networks,
checks whether an operation requiring continuous connection between the communication unit and any one of the plurality of networks is being executed,
checks whether a virtual network has been established, and
switches the connection destination of the communication unit from the first network to the next connection destination candidate when the operation is being executed and the virtual network has been established.

2. A network switching method comprising:
a decision step of deciding, when a first network of a plurality of networks is a connection destination, a next connection destination candidate to be connected after the first network, from the plurality of networks based on priority levels of the plurality of networks;
a first checking step of checking whether an operation requiring continuous connected to any one of the plurality of networks is being executed;
a second checking step of checking whether a virtual network has been established; and
a switching step of switching the connection destination from the first network to the next connection destination candidate based on results obtained in the first checking step and the second checking step.

3. The method according to claim 2, wherein in the switching step, based on the results obtained when it is determined in the first checking step that the operation is being executed and it is determined in the second checking step that the virtual network has been established, the connection destination is switched from the first network to the next connection destination candidate.

* * * * *